United States Patent
Hampton et al.

(10) Patent No.: US 8,440,937 B2
(45) Date of Patent: May 14, 2013

(54) SELF-CLEANING WELDING NOZZLE

(75) Inventors: Jay Hampton, Lenox, MI (US);
Alexander D. Khakhalev, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1188 days.

(21) Appl. No.: 12/332,389

(22) Filed: Dec. 11, 2008

(65) Prior Publication Data

US 2010/0147819 A1    Jun. 17, 2010

(51) Int. Cl.
*B23K 9/295* (2006.01)
*H05H 1/34* (2006.01)
*C04B 41/09* (2006.01)

(52) U.S. Cl.
USPC .............. 219/137.31; 219/137.43; 219/121.5; 219/121.51; 219/121.52; 427/376.2

(58) Field of Classification Search ............. 219/137.31, 219/651, 780, 54, 55, 61.12, 68, 69.1, 73.2, 219/73.21, 74, 76.1, 76.12, 76.13, 76.14, 219/76.16, 121.11, 121.13, 121.16, 121.27, 219/121.47, 121.8, 121.5, 121.51, 121.52, 219/253, 136, 137.52, 137.42, 137.43; 427/376.2
See application file for complete search history.

(56) References Cited

U.S. PATENT DOCUMENTS

| | | | | |
|---|---|---|---|---|
| 3,430,837 A | * | 3/1969 | Hein | 228/53 |
| 3,536,888 A | * | 10/1970 | Borneman | 219/137.43 |
| 3,597,576 A | * | 8/1971 | Bernard et al. | 219/137.43 |
| 4,280,043 A | * | 7/1981 | Feix et al. | 219/137.31 |
| 4,575,612 A | * | 3/1986 | Prunier | 219/137.43 |
| 4,662,558 A | * | 5/1987 | Hamanaka | 228/118 |
| 4,947,024 A | * | 8/1990 | Anderson | 219/137.61 |
| 4,954,690 A | | 9/1990 | Kensrue | |
| 5,034,593 A | * | 7/1991 | Rice et al. | 219/137.43 |
| 5,278,392 A | * | 1/1994 | Takacs | 219/137.43 |
| 6,811,821 B2 | * | 11/2004 | Maxwell et al. | 427/376.2 |
| 7,105,775 B2 | | 9/2006 | Giese | |
| 2006/0078738 A1 | * | 4/2006 | Goto et al. | 428/409 |
| 2007/0090168 A1 | * | 4/2007 | Snow et al. | 228/101 |

FOREIGN PATENT DOCUMENTS

| | | | |
|---|---|---|---|
| JP | 63137581 A | * | 6/1988 |
| JP | 01104478 A | * | 4/1989 |

OTHER PUBLICATIONS

Gas Metal Arc Welding, Wikipedia Encyclopedia at website: www.en.wikipedia.org/wiki/mig_welding, first date unknown, page last modified on Sep. 15, 2008.
Product sheets (4 pgs.) of Master Bond, Inc. of Hackensack, NJ 07601, from website: www.masterbond.com, date unknown, website copyright 1999-2008.

* cited by examiner

*Primary Examiner* — Joseph M Pelham
*Assistant Examiner* — Gyounghyun Bae

(57) ABSTRACT

A self-cleaning GMAW nozzle characterized by the inner surface thereof having a laminate group, preferably composed of sequentially alternating layers of metal and bonding material. Over a period of time of welding, welding spatter begins to accumulate upon an outermost metal layer of the laminate group. As the heat of welding proceeds over this same time, the adhesion of the adjoining bonding layer releases, whereby the outermost metal layer detaches, exposing a clean, new outermost metal layer. The process sequentially repeats until all metal layers have detached.

5 Claims, 3 Drawing Sheets

SELF-CLEANING WELDING NOZZLE

TECHNICAL FIELD

The present invention relates to welding nozzles of the type used for gas metal arc welding (GMAW), wherein the welding nozzle is utilized in the provision of a shielding gas for the arc welding operation. More particularly, the present invention relates to a welding nozzle having a laminate construction which provides a self-cleaning feature.

BACKGROUND OF THE INVENTION

Gas metal arc welding (GMAW) is very commonly used to weld metals of a wide range of types, wherein an arc welding apparatus is combined with a shielding gas apparatus for providing a gas shield at the weld site. The shielding gas may be an inert gas, such as argon or helium, a generally nonreactive gas, such as carbon dioxide, or combinations thereof, including other gases, such as oxygen. The choice of shielding gas depends generally upon the type of metal being welded.

As known in the art, a GMAW apparatus utilizes a source of electric current, usually D.C., which is provided to an electrode. From the tip of the electrode, the current passes to a workpiece separated therefrom a short distance, whereupon welding of the workpiece transpires while the shielding gas floods the environment of the welding. To provide GMAW in a safe and efficient manner, a welding gun is used which provides user or robotic control, and includes a GMAW nozzle whereat are disposed the electrode and the delivery orifice for the shielding gas. Examples welding guns are exemplified in U.S. Pat. No. 4,954,690 and U.S. Pat. No. 7,105,775.

Turning attention to FIGS. 1A through 1C, the details of a typical GMAW nozzle will be discussed.

As shown generally at FIGS. 1A and 1B, a GMAW nozzle assembly 10 includes a GMAW nozzle 12 removably connected by a threaded section 10a to a gooseneck component 14 of a welding gun. The GMAW nozzle 12 includes a generally cylindrical shield housing 16 having an open end 16a. The gooseneck component 14 includes: an internal electrode feeder 18 to which is connected a wire-like electrode 20 having an electrode tip 20a projecting from the open end of the shield housing; an electrode contact tube 22 for delivering welding electrical current to the electrode, and a shielding gas passage 24, including communicating orifices 24a through which the shielding gas G is delivered into the shield housing 16 so as to streamingly exit therefrom at the open end 16a thereof.

As shown at FIG. 1C, after a period of operation of the GMAW nozzle assembly 10, the internal shield surface 16b of the shield housing has accumulated welding spatter 26 which has obstructed the open end 16a. This condition is quite problematic, as it can not only restrict or misdirect the streaming flow of the shielding gas, it can adversely affect the proper function of the electrode. Either of these problems can have an adverse affect on the quality of the weld provided to the workpiece. Thus, required is a periodic maintenance regimen to clear accumulated debris and replace the GMAW nozzle in the event the debris cannot be cleared. The need to regularly service the nozzle shield results in added expenses, including down time for the GMAW apparatus.

Accordingly, what remains needed in the art is to somehow provide a GMAW nozzle assembly that does not suffer from the debilitations of welding spatter accumulation as presently plagues the current state of the art of GMAW nozzles.

SUMMARY OF THE INVENTION

The present invention is a GMAW nozzle assembly that does not suffer from the debilitation of welding spatter accumulation as presently plagues the current state of the art GMAW nozzles, in that the internal surface of the GMAW nozzle is characterized by a laminate group, the layers of which sequentially detaching during operation so as to continually provide a clean internal surface of the GMAW nozzle.

The self-cleaning GMAW nozzle according to the present invention is characterized by the inner surface of the nozzle shield having a laminate group, preferably composed of sequentially alternating layers of metal and heat sensitive bonding material. A nonlimiting example of a suitable laminate group is a layer series consisting of concentric copper layers interposed, and adjoiningly bonded by, concentric heat sensitive polymer layers.

In operation of the self-cleaning GMAW nozzle, over a period of time of use, welding spatter begins to accumulate upon the internal surface of the shield housing which, according to the present invention, is an outermost metal layer of the laminate group. As the heat of welding proceeds over this same time duration, the adhesion of the outermost bonding layer with respect to the outermost metal layer and the oppositely disposed, adjoining (next-to-outermost) metal layer releases (that is, the adhesive bond fails). As such, the outermost metal layer detaches and is blown out of the self-cleaning GMAW nozzle by force of the streaming shielding gas, thereby exposing the metal layer that was just underneath, the formerly next-to-outermost metal layer, which now is the new outermost metal layer, free of welding spatter. This process continues until all the metal layers have sequentially become exposed, after which it is time to replace the self-cleaning nozzle.

Accordingly, it is an object of the present invention to provide a self-cleaning GMAW nozzle characterized by the inner surface of the nozzle shield having a laminate group of alternate layers of metal and bonding material, wherein heat of welding acts on the presently outermost bonding layer so as to cause its adhesive failure and release of the outermost metal layer, exposing a spatter-free, next metal layer thereunder.

This and additional objects, features and advantages of the present invention will become clearer from the following specification of a preferred embodiment.

DESCRIPTION OF THE PREFERRED EMBODIMENT

Figure 1A:
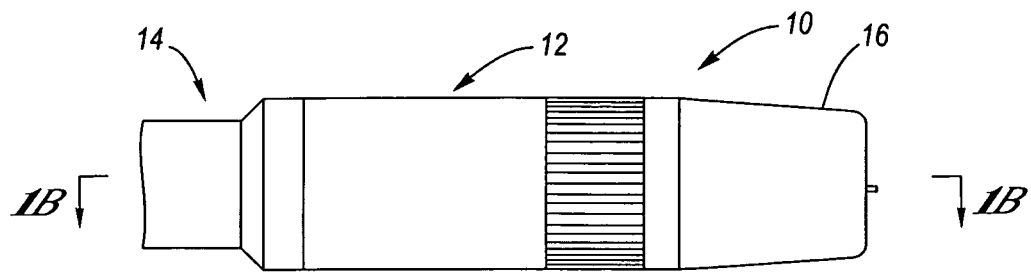
FIG. 1A is a side elevational view of a GMAW nozzle assembly used in the prior art.

Referring now to the Drawing, FIGS. 2 through 6B depict aspects of a self-cleaning GMAW nozzle 100 according to the present invention.

Figure 2:
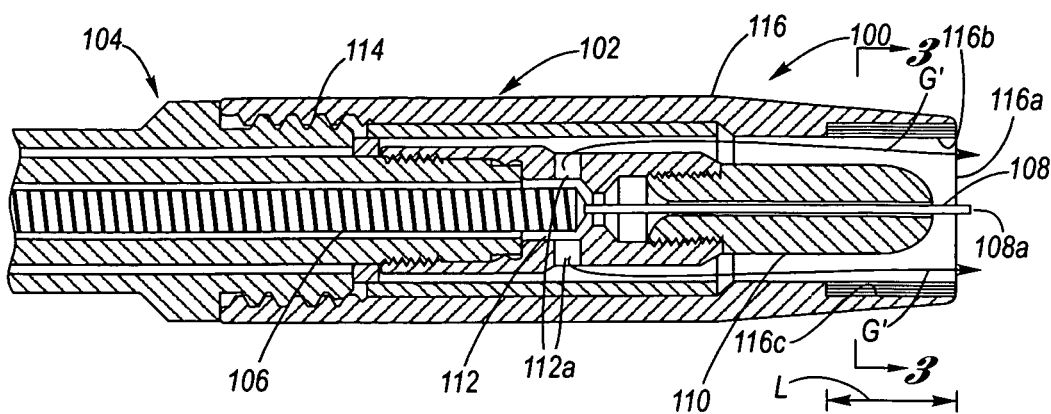
FIG. 2 is a sectional side view of a GMAW nozzle assembly including a self-cleaning GMAW nozzle according to the present invention.
Figure 3:
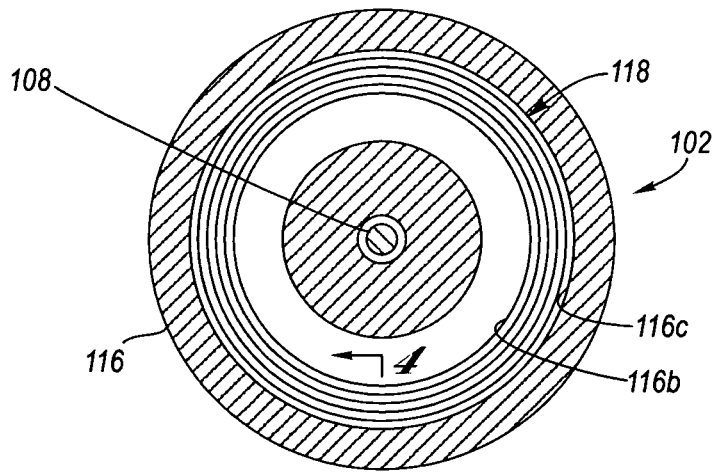
FIG. 3 is a sectional view, seen along line 3-3 of FIG. 2.
Figure 4:
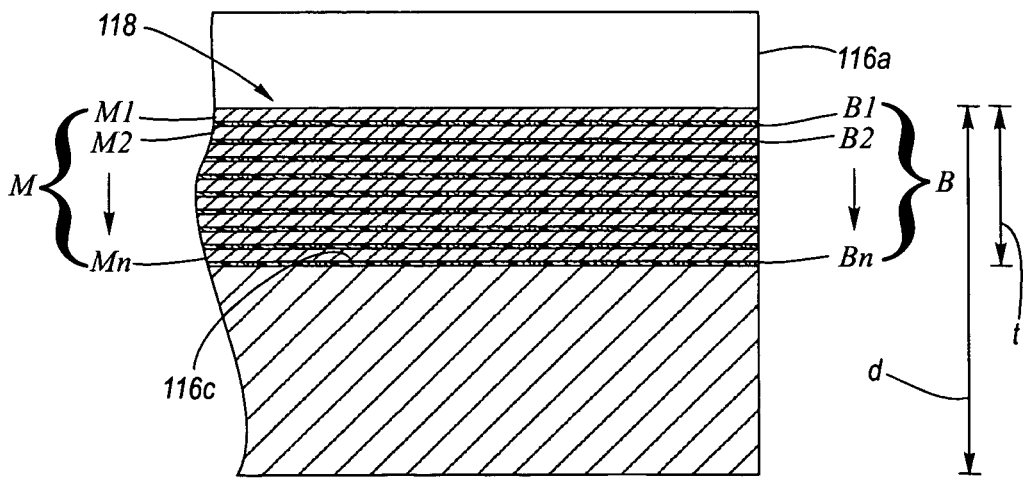
FIG. 4 is a partly sectional view, seen along line 4-4 of FIG. 3.

As shown by way of example at FIGS. 2 through 4, the self-cleaning GMAW nozzle 100 according to the present invention forms a component part of a GMAW nozzle assembly 102.

Figure 1B:
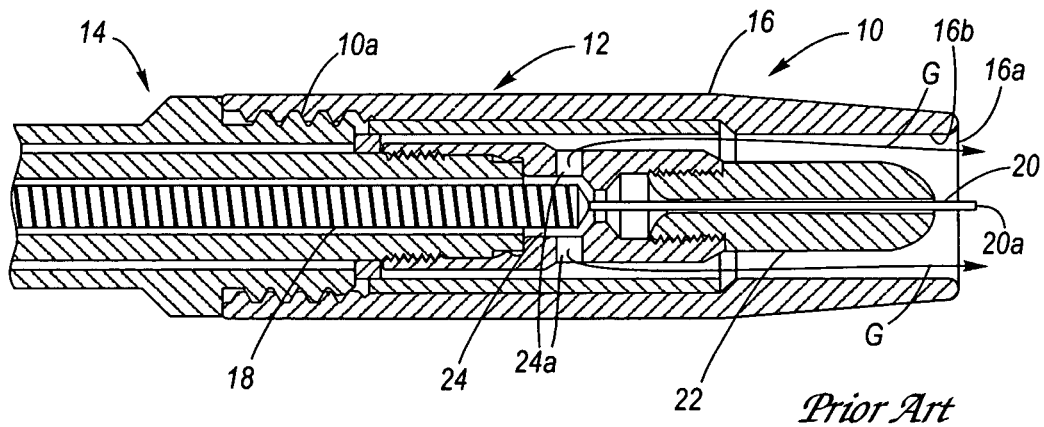
FIG. 1B is a sectional side view of the prior art GMAW nozzle assembly, seen along line 1B-1B of FIG. 1A.
Figure 1C:
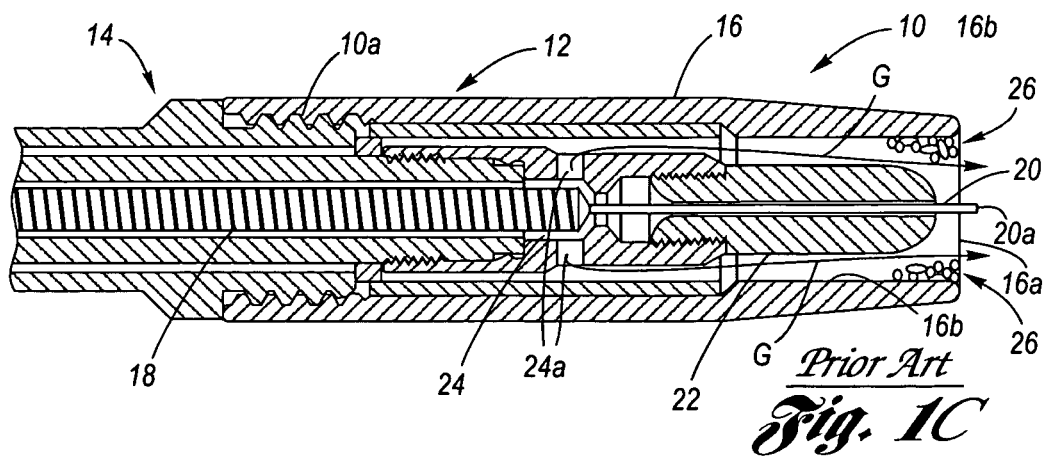
FIG. 1C is a sectional side view of the prior art GMAW nozzle assembly as in FIG. 1B, wherein now welding spatter plagues the nozzle shield as a result of a period of operation.

By way of exemplification, the GMAW nozzle assembly 102 includes a gooseneck component 104 of a welding gun, which is known in the art, but may not necessarily be of the type shown at FIGS. 1A through 1C. The gooseneck component 104 includes, by way of example: an internal electrode feeder 106 to which a wire-like electrode 108 is connected; an electrode contact tube 110 for delivering welding electrical current to the electrode, and a shielding gas passage 112, including communicating orifices 112a through which the shielding gas G' is streamingly delivered.

The self-cleaning GMAW nozzle 100 of the present invention is removably attached to the gooseneck component 104 by a threaded section 114. A self-cleaning, generally cylindrical, shield housing 116 surrounds the electrode 108 and the electrode contact tube 110, having an open end 116a out of which the electrode tip 108a projects. As shown at FIG. 3, the aforesaid components are concentrically arranged.

In particular with respect to the self-cleaning aspect of the present invention, the internal shield surface 116b of the shield housing 116 is characterized by a laminate group 118 disposed at a recessed internal shield surface 116c and having a thickness extending for example over a substantial portion of the thickness of the shield housing. For nonlimiting example, if the shield housing has an over-all average wall thickness d of about 3 mm, the included thickness t of the laminate group could be about 0.5 to 1.5 mm. The axial length L of the laminate group 118 includes all the surfaces of the inner shield surface 116b whereat there is likelihood for welding spatter to accumulate, which may be longer or shorter than that shown. In this regard, the axial length L also presumes the welding heat influence upon the outermost bonding layer will be over-all applied to provide the intended timing of outermost metal layer detachment, as discussed hereinbelow.

The laminate group 118 is preferably composed of sequentially alternating layers, composed of a plurality of metal layers M, for example consisting of metal layers M1, M2, . . . Mn, and a plurality of interposing heat sensitive bonding material layers B, for example consisting of bonding material layers B1, B2, . . . Bn, wherein the number of layers, n, is selected as for example based upon by the dimensional factors and intended welding duty cycles for which the self-cleaning nozzle is expected to perform. The bonding layers B serve to adhere the respectively adjoining metal layers M thereto and thereby adhere the laminate group 118 together as a whole, as well as adhering the laminate group to the recessed internal shield surface 116c.

An example of a suitable metal for the metal layers M is copper, but other metals may be used, as well; the choice generally depends on the type of welding operations which will be used with the self-cleaning nozzle 100. An example of a suitable bonding material for the bonding material layers B is a heat sensitive polymer adhesive. For example, depending on application and selection of metal for the metal layers, an adhesive release temperature of the bonding material layer B may be in the range of about 300 and 600 degrees Fahrenheit. Heat sensitive polymers are well known and generally available, for example through Master Bond, Inc. of Hackensack, N.J.

By way of example, the laminate group 118 may be fabricated by any modality known in the art of lamination, as for example by dipping, spraying, press-forming, laminating at elevated temperature, rolling, etc. The thickness of each of the metal layers M may be, for nonlimiting example, on the order of between about 50 and 200 microns. The thickness of each of the bonding material layers B may be, for nonlimiting example, on the order of about 10 and 50 microns. The selection of the metal and bonding material layers respective thicknesses may be otherwise depending for example, upon choice of materials, nozzle dimensions and intended type of welding.

Operation of the self-cleaning GMAW nozzle 100 according to the present invention will now be detailed with additional attention being directed to FIGS. 5A through 6B.

Figure 5A:
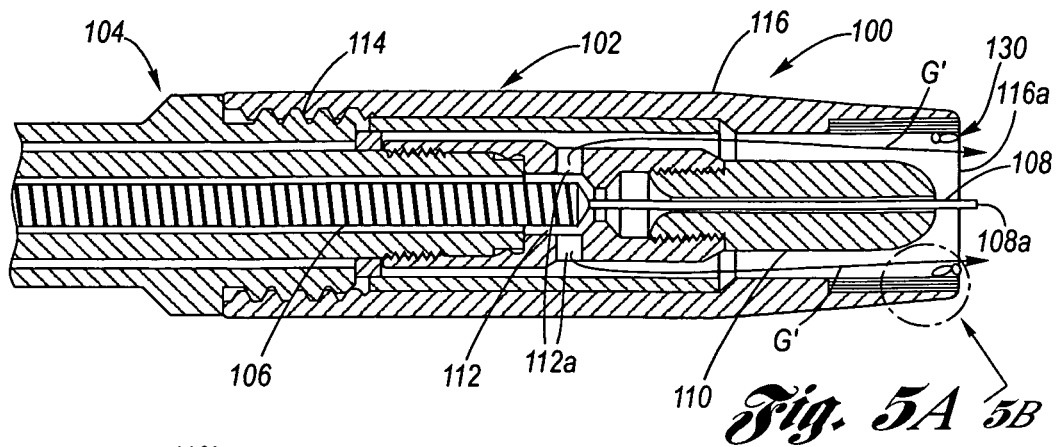
FIG. 5A is a sectional side view of a GMAW nozzle assembly including a self-cleaning GMAW nozzle according to the present invention, wherein now after a period of operation, welding spatter has started to accumulate at the internal surface of the nozzle shield.
Figure 5B:
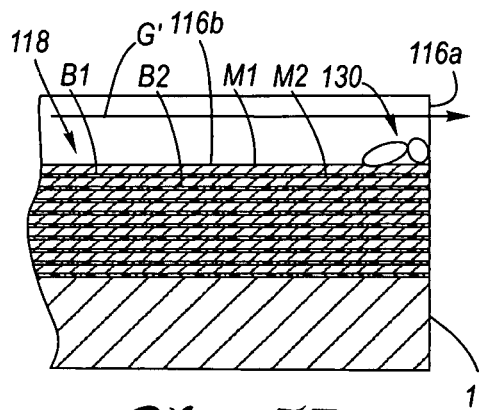
FIG. 5B is a partly sectional view, seen at circle 5B of FIG. 5A.
Figure 5C:
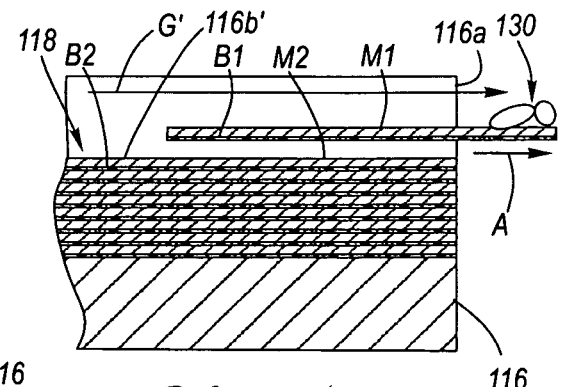
FIG. 5C is a view similar to FIG. 5B, wherein now the outermost metal layer has separated, according to the method of the present invention, from the laminate group.

As exemplified by FIGS. 5A and 5B, over a period of time of use of the self-cleaning GMAW nozzle 100 during which time welding has transpired, welding spatter 130 will begin to accumulate upon the internal shield surface 116b of the shield housing 116 which, according to the present invention, is initially an outermost metal layer M1 of the laminate group 118. As the heat of welding proceeds over this same time duration, the heat conducts through the outermost welding layer and heats the outermost bonding material layer B1.

As exemplified by FIGS. 5C through 6B, as the outermost bonding material layer B1 heats and reaches its release temperature over a predetermined time of welding heat application, which may be empirically determined, the adhesion of the outermost bonding material layer B1 with respect to the outermost metal layer M1 and the oppositely disposed, adjoining (next-to-outermost) metal layer M2, releases, the timing including being that necessary for the heat to so affect the portion of the outermost bonding material layer most remotely distant from the open end 116a.

Figure 6A:
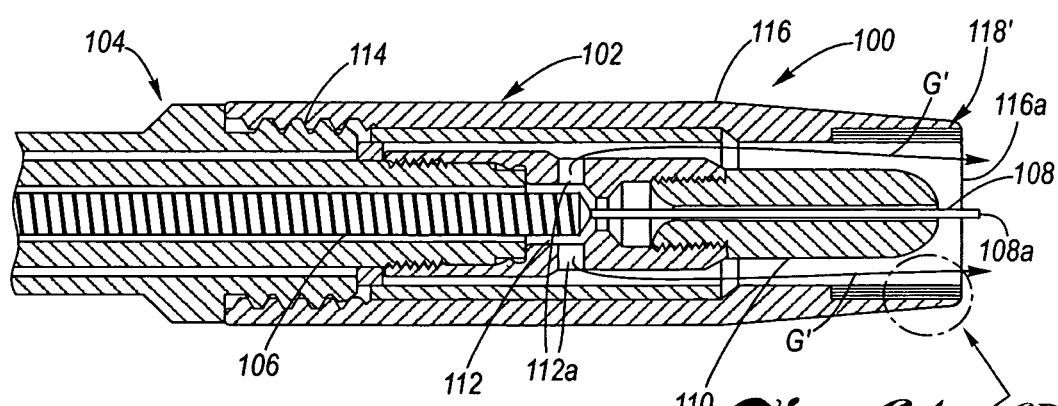
FIG. 6A is a sectional side view of the GMAW nozzle assembly of FIG. 5A, wherein, according to the method of the present invention as shown at FIG. 5C, the next-to-outermost metal layer is now the new outermost metal layer, whereby there is an absence of welding spatter at the new inside surface of the nozzle shield.
Figure 6B:
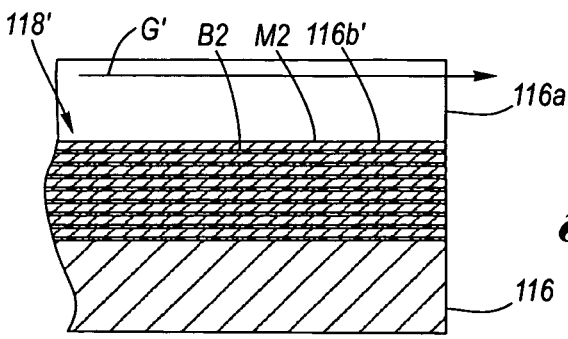
FIG. 6B is a partly sectional view, seen at circle 6B of FIG. 6A.

Upon release of adhesion by the outermost bonding material layer B1 the outermost metal layer M1 detaches and is blown out of the self-cleaning GMAW nozzle 100, for example along arrow A, by force of the streaming shielding gas G', thereby exposing the metal layer that was just underneath, to wit: the formerly next-to-outermost metal layer M2, which now is the new outermost metal layer 116b', free of welding spatter, as shown at FIGS. 6A and 6B. The laminate group 118' now has one less metal layer and one less bonding material layer than just previously, wherein with respect to the outermost bonding material layer B1, it may accompany the exiting of outermost metal layer M1 (as shown), or may in part remain at the surface of the new outermost metal layer M2, whereupon it will quickly degrade away by the welding heat. This process continues until all the metal layers M1 through Mn have sequentially become exposed, after which it is time to replace the self-cleaning nozzle.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A self-cleaning nozzle for a gas metal arc welding apparatus, comprising:
    a generally cylindrical shield housing having an internal shield surface and an open end, said shield housing having a recessed internal shield surface adjoining said open end; and
    a laminate group adhered to said recessed internal shield surface of said shield housing, said laminate group adjoining said open end and extending a predetermined axial length therefrom;
    wherein said laminate group comprises sequentially alternating layers of a first material and a heat sensitive bonding material in mutually concentric disposition; and
    wherein the heat sensitivity of said bonding material is selected such that during welding by the welding apparatus, heat of the welding is transmitted through an outermost first material layer such that the heat causes adhesive release of an adjoining bonding material layer, whereupon the outermost first material layer detaches from said laminate group exposing a new outermost first material layer.

2. The self-cleaning nozzle of claim 1, wherein said first material comprises a metal.

3. The self-cleaning nozzle of claim 2, wherein said metal comprises copper, and wherein said heat sensitive bonding material is a heat sensitive polymer.

4. The self-cleaning nozzle of claim 2, wherein said laminate group is structured such that successive layers of the bonding material adhesively release in successive response to the heat of welding, thereby exposing successive new outermost first material layers.

5. The self-cleaning nozzle of claim 4, wherein said metal comprises copper, and wherein said heat sensitive bonding material is a heat sensitive polymer.

* * * * *